Sept. 20, 1971  R. E. McDONALD ETAL  3,605,908
FORESTRY WORK VEHICLE

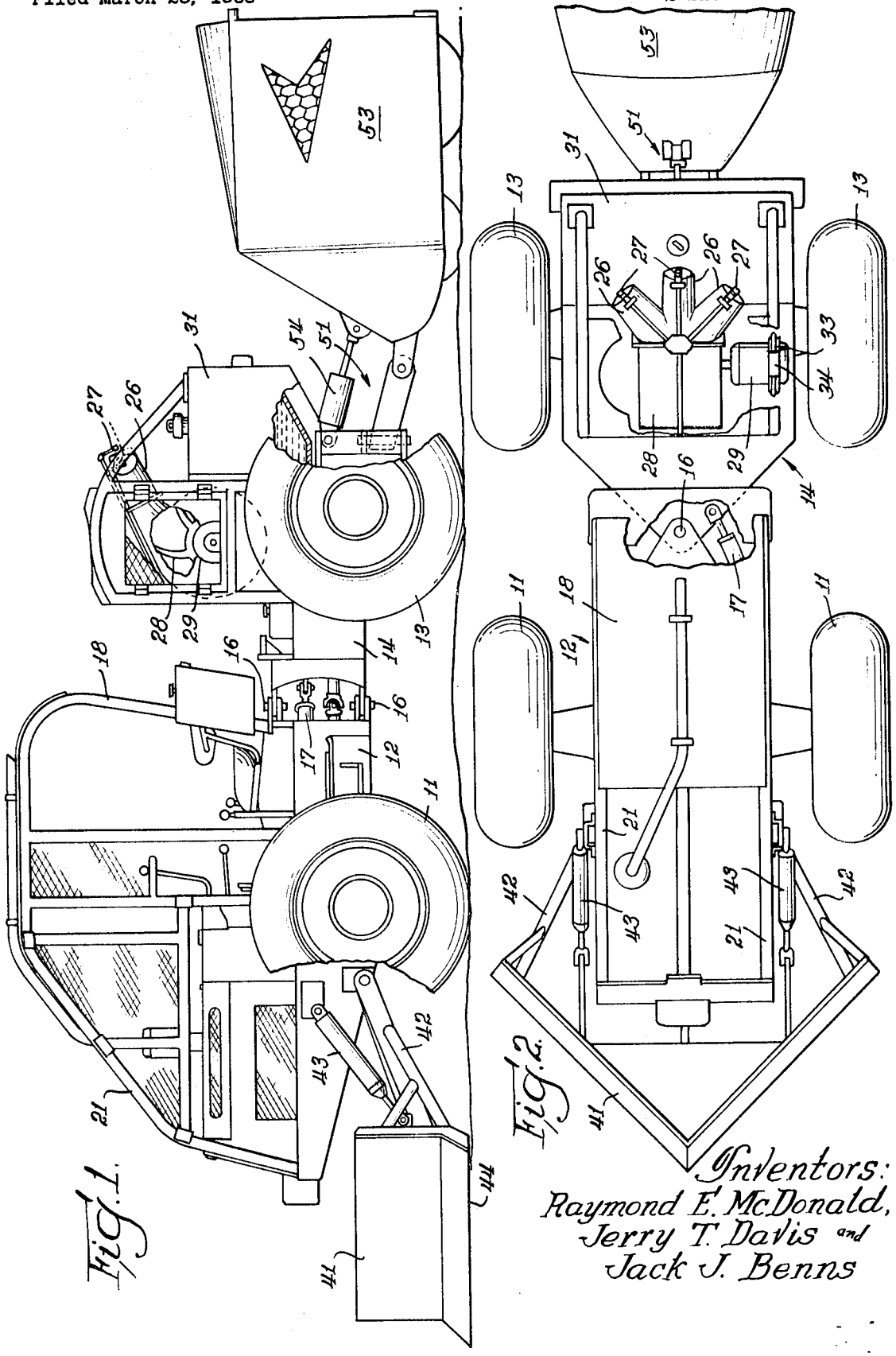

Filed March 28, 1968  2 Sheets-Sheet 2

United States Patent Office 3,605,908
Patented Sept. 20, 1971

3,605,908
FORESTRY WORK VEHICLE
Raymond E. McDonald, L'Anse, Mich., Jerry T. Davis, Monticello, Ark., and Jack J. Benns, Chicago, Ill., assignors to Pettibone Corporation, Chicago, Ill.
Filed Mar. 28, 1968, Ser. No. 716,945
Int. Cl. A01b 49/04
U.S. Cl. 172—438        5 Claims

ABSTRACT OF THE DISCLOSURE

The basic work vehicle comprises a chemical sprayer carried by a rough terrain four-wheel drive chassis, articulated for steering. The sprayer is carried by the rear-half of the articulated chassis, is directed upwardly and rearwardly, and has three jet openings, each with its own mist-producing spray head, to spray a wide swath with satisfactory uniformity. The blower is driven by a hydraulic motor which makes it easily supplied with power from the forward half of the vehicle on which the engine and pumps are mounted. The hydraulic motor is of the positive displacement type and has a by-pass provided with a pressure relief valve which prevents damage when the hydraulic fluid is shut off by a manual control valve. The vehicle carries a hydraulically raiseable V shaped plow at its front end for shearing or bending aside light undergrowth and camming frame bars overhead for facilitating passage under low limbs of trees. A trailer hitch is provided and a large chemical tank is shaped to give access to the hitch under it. Attachments for the hitch include a fire lane plow and at least one planter for planting tree seeds or seedlings. Because of the articulation, the vehicle with trailer can "snake" a winding course among trees, with the front wheels, rear wheels and trailer all following the path cleared by the V shaped plow at the front.

INTRODUCTION

The invention of which this disclosure is offered for public dissemination in the event that adequate patent protection is available relates to work vehicles especially suitable for forestry work, preferably with trailer attachments to provide multiple uses.

A main use for the vehicle contemplated is in spraying a chemical suitable for killing broadleaf vegetation. In growing pine or other soft wood or evergreen trees, growth can be considerably enhanced by killing all other trees. This is especially important in southern climates where some of the broadleaf trees grow quite rapidly and tend to smother out pine growth. Selective killing, using chemicals known as broadleaf killers, has been practiced heretofore in connection with pine tree forestry. However, the vehicles used for the purpose have been somewhat unsatisfactory because their coverage has either been too narrow or too varied. According to the present invention, this fault is overcome by providing a blower head with three nozzles, one centered and one to each side, and providing each with its own mist-producing spray head so that they are uniformly rich in chemical droplets.

Maximum ability to "snake" through a forest is provided by articulation, a V plow, and up-camming guard bars. The articulation, together with a desire for greater dependability in driving the blower, creates a problem. According to the present invention, the blower is driven by hydraulic motor, to which power is easily delivered from a separate section of the vehicle. A positive displacement hydraulic motor for the blower is desirable, but with this manner of drive, there is a problem of avoiding damage by too sudden stoppage. This is solved by providing a by-pass across the ports of the hydraulic motor with a pressure relief valve closing this by-pass line except when pressure higher than normal operating pressures is developed.

The hydraulic drive of the blower has thus proved to be very advantageous in making it practical to use a common type of articulated forest vehicle having the engine in the front section, even though the blower should, of course, be at the rear and directed somewhat rearwardly, away from the operator. The necessary two hydraulic hoses are easily extended between the two sections of the articulated vehicle. By passing them close to the articulated axis, they do not even need any substantial extra length to accommodate the articulation.

The type of vehicle in question, being commonly provided with up-camming side guard bars or frame members is very desirable for forest work. The up-camming side guards raise branches when necessary for passage of the vehicle. The vehicle can "snake" closely around a large tree, inasmuch as the rear wheels follow the front wheels. According to the present invention, passage through fairly thick undergrowth or brush is facilitated by using a V shaped surface plow clearing a path for the vehicle. Preferably the plow has sharp forward edges which will shear through many types of growth. If pine seedlings or saplings are already growing, they are sufficiently flexible so that many of them will be merely bent over and will survive.

From the economic standpoint, another fault of previous spray vehicles has been their limited use. According to the present invention, the vehicle can be kept busy a large part of the year by attaching one of a choice of work trailers to it. To this end, a coupler is provided in a position accessible without removing the chemical tank, which is conveniently located at the rear of the main vehicle. One working trailer which can be attached is a fire lane plow. It is also desirable that a planter trailer be available either for planting seed or for planting seedlings, or both. Both fire plows and planters have been known heretofore, but it has been found highly desirable to make them attachable to the spray vehicle so that with a minimum of work one expensive articulated rough terrtain vehicle can serve several purposes. Furthermore, by attaching these trailers in an articulated manner to an articulated vehicle, the entire assembly "snakes" its way in a path cleared by the V plow at the front.

By somewhat more work, the spray unit and its tank can be removed and replaced by conventional "skidder" equipment.

Additional advantages and objects of the invention will be apparent from the following description and from the drawings.

DESIGNATION OF FIGURES

FIG. 1 is a side view of the form of the invention chosen for illustration as showing a planting trailer attached.

FIG. 2 is a fragmentary top view of the structure of FIG. 1.

INTENT CLAUSE

Figure 3:
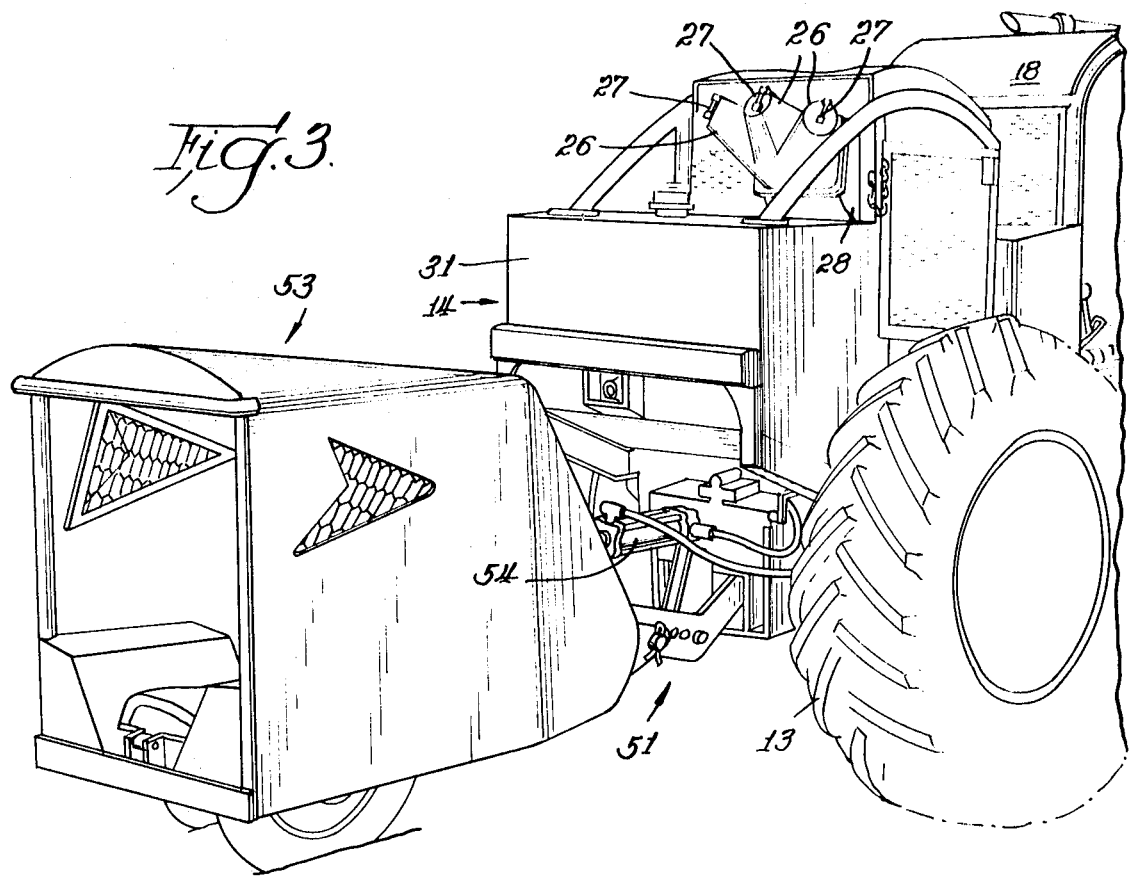
FIG. 3 is a fragmentary perspective view of the structure of FIG. 1.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

GENERAL DESCRIPTION

The vehicle is carried by forward drive wheels 11 carried by a forward chassis section 12, and rear drive wheels 13 carried by a rear chassis section 14. The two chassis sections are articulated for jackknifing or relative pivotal movement about a vertical axis at 16 and are steered by producing such action by means of one or more hydraulic steering cylinders 17, under manual control from cab 18. The axis of articulation is approximately midway between the front and rear axles so that the rear wheels will follow closely in the tracks of the front wheels in making turns. Such vehicles have been used in forest work heretofore, especially as skidders for dragging logs. They have heretofore been provided with a frame of bars 21 which may be called up-camming bars because of their ability to slide under overhanging branches and raise them for passage of the vehicle.

CHEMICAL SPRAYER

One of the most important uses planned for the work vehicle of this invention is mist-spraying with a chemical suitable for killing broadleaf vegetation, including deciduous trees. According to present invention, three nozzles 26 are provided, each with its own injection spray head 27, the angularity of the nozzles being fanned out laterally to give satisfactorily uniform coverage over a wide path or swath. Air is blown out through nozzles 26 at high speed by a blower 28 which is driven by a hydraulic motor 29. When a manual valve (not shown) is operated, chemical is pumped at an atomizing pressure through spray heads 27. The pump (not shown, but driven by a belt from the shaft of blower 28) draws chemical from the bottom of tank 31.

Hydraulic motor 29 can, of course, be supplied with power by two flexible high pressure hoses extending near the articulation axis to a manual control valve, hydraulic pump, etc., on the front chassis section 12. Of course, the manual control valve is operated by a handle conveniently located in the cab 18.

The hydraulic motor 29 is preferably of the positive displacement type to make effective use of high hydraulic pressure, specially in starting. A gear pump, is suitable. It is provided with a by-pass 33 which during normal operation is maintained closed by a pressure relief valve 34. When the operator closes the control valve for the motor 29 it causes a coasting action which converts the motor 29 to a pump. Since this motor is desirably of the positive displacement type, a very high pressure would be developed if it were not relieved by opening of the relief valve 34 so that fluid can pass through the by-pass 33. However, the pressure developed has a strong braking action on the rotating parts so that they slow down very quickly and smoothly. Wasting of chemicals is avoided, and the area sprayed can be controlled with relatively great accuracy.

Passage of the vehicle through undergrowth or brush is aided by V shaped plow 41 which is carried by pivoted arms 42 and can be raised by a control lever in the cab actuating one or more hydraulic cylinders 43. The V shaped plow is preferably provided with a relatively sharp bottom edge 44. This edge will shear off much of the undergrowth encountered, although small evergreen trees or saplings are often flexible enough so that they are bent over and survived.

ATTACHMENTS

Inasmuch as killing of broadleaf trees usually is performed only a short part of the year, it is highly desirable that the vehicle of this invention be adaptable for other uses. Accordingly, a trailer hitch 51 is mounted at the rear of the rear chassis section 14. To afford convenient access to this trailer hitch, and still maintain a large capacity in tank 31, the bottom of the tank is sloped downwardly and forwardly.

Figure 4:
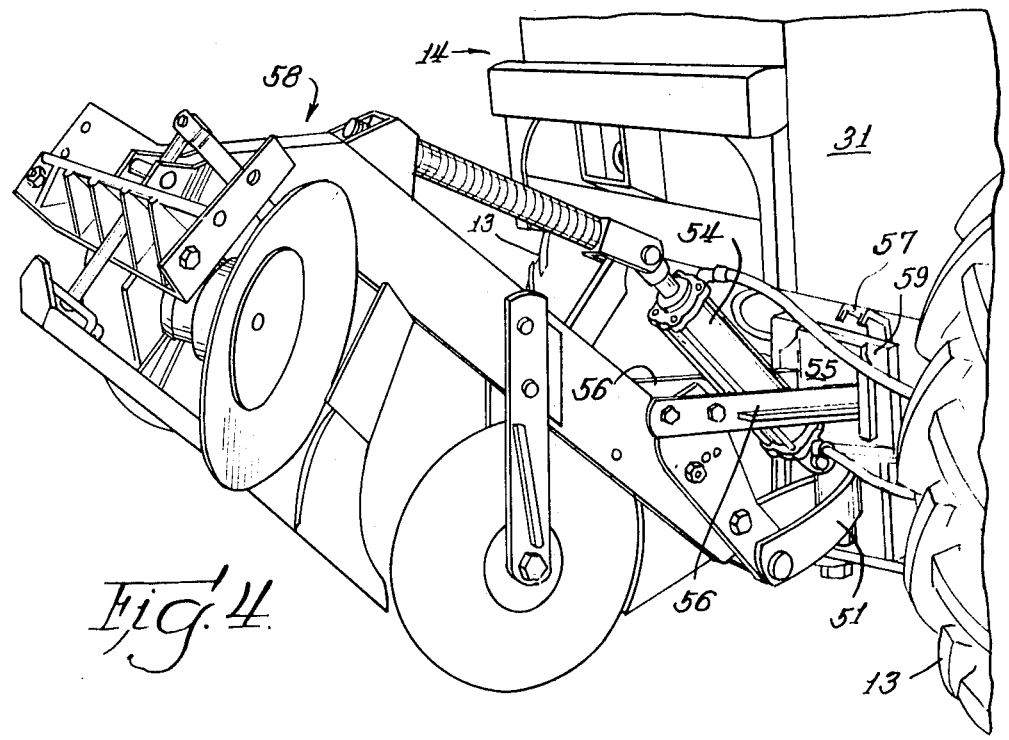
FIG. 4 is a view similar to FIG. 3 but showing a fire lane plow in raised position.

In FIG. 1, a planter 53 has been shown as the trailer attached to hitch 51. The details of the planter are not fully shown, the ground working portions being conventional. They cut a furrow in the ground and then push the ground back over the furrow after the seeds or seedlings have been dropped in the furrow either automatically or manually. It is important that such a device be raised out of the ground during travel to or from the planting site and for this purpose a hydraulic cylinder 54 is provided. As seen in FIG. 4, the cylinder 54 will clamp a lock-up plate 55 carried by arms 56 at the forward end of the planter against the back of mounting 59 when the planter is in the raised position, thereby holding the planter filmly against swaying. A latch 57 may be swung down to hold lock-up plate during travel to hold the trailer safely raised when not working. The hitches shown diagrammatically in other figures would be of the same type and are interchangeable, as by pulling a king pin.

Another attachment that is highly desirable is a firelane plow 58 shown in FIG. 4. This is attached in the same manner and may also be raised out of working position by the cylinder 54. Such a plow is especially useful where the growth is quite light so that the bare strip it leaves behind it has a good chance of stopping the spread of fires.

By locating the trailer hitch 51 approximately midway between the rear axle and the wheels or other effective ground engagement of the trailer, or at least well behind the rear axle, the trailer is made to follow closely in the paths of the vehicle. The ground-working portions are narrower than the wheel base, and hence there is room for some side shift in turning without running outside of the wheel tracks. Since the articulation between the front chassis 12 and rear chassis 14 is also approximately midway between the front and rear wheels, the entire vehicle can snake along the winding path cleared by the plow 41.

Preferably the tow bar attachment point 56 is so low as to be close to the minimum chassis ground clearance. This gives a favorable angle of pull on the ground-working equipment of the trailer.

Preferably the tank 31 and associated sprayer parts are removable from the frame, which is then adapted to receive skidder equipment including power winch means and line guide.

ACHIEVEMENT

From the foregoing it is seen that the forestry work vehicle has been provided which, partly because of its multiple purposes, makes spraying for killing of broadleaf trees quite satisfactory both technically and economically. A high degree of uniformity of coverage over a wide path is achieved. In addition, good navigation is provided by the V plow which clears a path and by articulation which follows in the path cleared and permits snaking among larger trees.

We claim:

1. A multi-purpose forestry work vehicle including an articulated chassis carrying on its front section a V plow, a prime mover, and carrying on its rear section a chemical supply tank and an air blower having a plurality of outflow air nozzles aimed in varying rearward and upward directions, each provided with a sprayer connected to the chemical supply tank;

and a forestry work trailer articulated to the rear section at the rear thereof and provided with ground working means;

the axes of articulation being on lines extending upwardly approximately midway between the respective transverse lines of ground engagement, whereby the succesive portions follow closely in the path of leading portions.

2. A forestry sprayer vehicle including an articulated chassis carrying on its front section a prime mover, and hydraulic pump means, and carrying on its rear section a chemical supply tank and an air blower having a plurality of outflow air nozzles aimed in varying rearward and upward directions, each supplied with a sprayer connected to the chemical supply tank;

a rotary hydraulic motor of the positive displacement type carried by the rear section for driving the blower and means for connecting the pump means thereto, including a control valve and flexible conduit means passing close to the axis of articulation;

a by-pass connected across the motor, said motor being of a type rapidly braked by restricted outflow when running by momentum, and a relief valve connected in the by-pass constantly having characteristics to maintain the by-pass closed against normal operating pressures for the motor, to open in response to higher pressures developed by the motor when the control valve stops flow to and from the motor, and to maintain a pressure having a strong braking action on the motor.

3. A forestry sprayer vehicle including a chassis, a prime mover carried by the chassis, hydraulic pump means driven by the prime mover, a chemical supply tank and an air blower having an air nozzle provided with a sprayer connected to the chemical supply tank to disperse a chemical mist in the air stream;

a positive displacement rotary hydraulic motor for driving the blower, means for connecting the pump means thereto, a control valve for shutting off the flow in said means, a by-pass across the motor, and a relief valve connected in the by-pass constantly having characteristics to maintain the by-pass closed against normal operating pressures for the motor, to open in response to higher pressures developed by the motor when the control valve stops flow to and from the motor, and to maintain a pressure having a strong braking action on the motor.

4. A forestry sprayer vehicle including an articulated chassis carrying on its front section a prime mover, and hydraulic pump means, and carrying on its rear section a chemical supply tank and an air blower having a plurality of outflow air nozzles aimed in varying rearward and upward directions, each supplied with a sprayer connected to the chemical supply tank;

a rotary hydraulic motor carried by the rear section for driving the blower and means for connecting the pump means thereto, including flexible conduit means passing close to the axis of articulation;

in which the chemical supply tank is located above a trailer hitch at the rear of the vehicle but is provided with a bottom sloping upwardly and rearwardly from directly above the trailer hitch to give access to the trailer hitch.

5. A multi-purpose forestry sprayer vehicle including an articulated chassis carrying on its front section a prime mover and hydraulic pump means, and carrying on its rear section a chemical supply tank and an air blower driven by said prime mover having a plurality of outflow air nozzles aimed in varying rearward and upward directions, each supplied with a sprayer connected to the chemical supply tank; and in which the chemical supply tank is located above a trailer hitch at the rear of the vehicle but is provided with a bottom sloping upwardly and rearwardly from directly above the trailer hitch to give access to the trailer hitch.

References Cited

UNITED STATES PATENTS

| | | | |
|---|---|---|---|
| 1,982,052 | 11/1934 | Hennessy | 239—172X |
| 2,363,776 | 11/1944 | Dale | 239—160X |
| 2,551,789 | 5/1951 | Copley | 239—565X |
| 2,990,632 | 7/1961 | Noblin | 37—98 |
| 3,366,016 | 1/1968 | Anderson | 60—53X |
| 1,479,994 | 1/1924 | Krotz | 172—321 |
| 2,402,008 | 6/1946 | Ariens | 172—491 |
| 2,580,236 | 12/1951 | Mascaro | 172—21X |
| 2,587,965 | 3/1952 | Campbell | 239—77X |
| 2,762,651 | 9/1956 | Tuft | 239—78 |
| 2,891,334 | 6/1959 | Kinzer | 37—44X |
| 3,049,186 | 8/1962 | Garrett | 180—51 |
| 3,216,664 | 11/1965 | Wolford et al. | 239—78X |
| 3,313,316 | 4/1967 | Thomas | 91—437X |
| 3,437,163 | 4/1969 | Lemmerman | 180—51 |
| 3,450,222 | 6/1969 | Ohlson | 180—51 |

ROBERT E. PULFREY, Primary Examiner

C. D. CROWDER, Assistant Examiner

U.S. Cl. X.R.

60—53; 239—77, 172